(12) United States Patent
Lev et al.

(10) Patent No.: US 12,307,820 B2
(45) Date of Patent: *May 20, 2025

(54) SYSTEM AND METHOD FOR PROCESSING DIGITAL IMAGES

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 771 days.

This patent is subject to a terminal disclaimer.

(21) Appl. No.: 17/489,932

(22) Filed: Sep. 30, 2021

(65) Prior Publication Data

US 2022/0019779 A1 Jan. 20, 2022

Related U.S. Application Data

(63) Continuation of application No. 16/550,231, filed on Aug. 25, 2019, now Pat. No. 11,138,414.

(51) Int. Cl.
*G06V 40/20* (2022.01)
*G06T 5/75* (2024.01)
(Continued)

(52) U.S. Cl.
CPC .............. *G06V 40/20* (2022.01); *G06T 5/75* (2024.01); *G06T 7/10* (2017.01); *G06T 7/215* (2017.01); *G06V 10/48* (2022.01); *G06V 20/52* (2022.01)

(58) Field of Classification Search
CPC ..... G06V 40/00–113; G06V 40/20–28; G06V 20/52; G06V 10/48; G06T 7/215; G06T 7/21; G06T 5/75
See application file for complete search history.

(56) References Cited

U.S. PATENT DOCUMENTS

| 2005/0232487 A1* | 10/2005 | Fleisher | ............ G01N 21/3563 |
| | | | 382/181 |
| 2014/0049465 A1* | 2/2014 | Tremaine | ............... G16H 40/63 |
| | | | 345/156 |

(Continued)

OTHER PUBLICATIONS

Notice of Allowance Dated Jul. 15, 2021 from the US Patent and Trademark Office Re. U.S. Appl. No. 16/550,231. ( 7 pages).

*Primary Examiner* — Sean T Motsinger (57) ABSTRACT

A system for processing digital images comprising: at least one remote hardware processor; and at least one device, comprising at least one processing circuitry configured for: receiving from at least one image sensor, electrically coupled to the processing circuitry, at least one digital image captured by the at least one image sensor; partitioning at least one object, identified in the at least one digital image, into a plurality of object segments; replacing in the at least one digital image each of the plurality of object segments with a schematic segment, illustrating respective object segment, to produce at least one schematic image; and sending the at least one schematic image to the remote hardware processor; wherein the remote hardware processor is adapted to: receiving the at least one schematic image from the at least one device; analyzing the at least one schematic image to identify at least one behavioral pattern.

19 Claims, 5 Drawing Sheets

(51) Int. Cl.
*G06T 7/10* (2017.01)
*G06T 7/215* (2017.01)
*G06V 10/48* (2022.01)
*G06V 20/52* (2022.01)

(56) References Cited

U.S. PATENT DOCUMENTS

| | | | | |
|---|---|---|---|---|
| 2014/0368493 | A1* | 12/2014 | Rogan | G01S 7/4802 |
| | | | | 345/419 |
| 2015/0160327 | A1* | 6/2015 | Banerjee | G06V 10/94 |
| | | | | 250/340 |
| 2015/0294481 | A1* | 10/2015 | Sakaue | G06V 40/23 |
| | | | | 600/595 |
| 2016/0307049 | A1* | 10/2016 | Hagisu | G06F 21/6254 |
| 2017/0185828 | A1* | 6/2017 | Yamamoto | G06T 11/60 |
| 2018/0025233 | A1* | 1/2018 | Iwai | G06V 40/161 |
| | | | | 348/143 |
| 2018/0278801 | A1* | 9/2018 | Ohno | G06V 40/10 |
| 2019/0066327 | A1* | 2/2019 | Fujimoto | G06T 7/60 |
| 2019/0102612 | A1* | 4/2019 | Takemoto | G06Q 30/0201 |
| 2019/0114836 | A1* | 4/2019 | Holzer | G06T 7/75 |
| 2020/0211154 | A1* | 7/2020 | Ng | G16H 30/40 |
| 2020/0211348 | A1* | 7/2020 | Wang | G06V 40/161 |
| 2020/0272888 | A1* | 8/2020 | Wang | G06V 40/103 |
| 2020/0364721 | A1* | 11/2020 | Pickering | G06Q 20/3825 |
| 2021/0019507 | A1* | 1/2021 | Brookshire | G06V 10/764 |
| 2021/0029305 | A1* | 1/2021 | Tang | H04N 23/633 |
| 2021/0056296 | A1* | 2/2021 | Lev | G06T 7/215 |
| 2021/0113889 | A1* | 4/2021 | Mao | A63B 24/0062 |
| 2021/0124914 | A1* | 4/2021 | Lin | G06N 3/045 |
| 2021/0124943 | A1* | 4/2021 | Datar | G06V 10/147 |

* cited by examiner

SYSTEM AND METHOD FOR PROCESSING DIGITAL IMAGES

RELATED APPLICATION/S

This application is a continuation of U.S. patent application Ser. No. 16/550,231 filed on Aug. 25, 2019. The contents of the above application are all incorporated by reference as if fully set forth herein in their entirety.

FIELD AND BACKGROUND OF THE INVENTION

The present invention, in some embodiments thereof, relates to a monitoring system and, more specifically, but not exclusively, to a monitoring system in a public space.

There is increased use of cameras in public and private spaces. A camera may be used to capture a digital image, and additionally or alternatively a digital video. Some possible uses of a camera are surveillance and detection of anomalous conditions such as a fire, water flooding or existence of smoke. Another possible use of a camera is video analytics, for example analyzing people traffic in a space.

There is a risk that a digital image or a digital video produced by a camera will be used in a way that violates a person's expectation to privacy, for example by publishing a digital image on a social network platform or by extracting private information from a digital image. In some countries there exist laws that restrict use of cameras, including imposing restrictions on locations where cameras may be placed and governing installation procedures, for example requiring installing signs to notify about the presence of a camera. Such laws restrict where images may be captured and warn a person of a risk, but do not prevent unauthorized use of a captured image.

There is a need to process images or videos captured by a camera in a way that reduces risk of violating a person's expectation of privacy.

SUMMARY OF THE INVENTION

It is an object of the present invention to provide a system and a method for processing digital images.

The foregoing and other objects are achieved by the features of the independent claims. Further implementation forms are apparent from the dependent claims, the description and the figures.

According to a first aspect of the invention, a system for processing digital images comprises at least one remote hardware processor; and at least one device, comprising at least one processing circuitry configured for: receiving from at least one image sensor, electrically coupled to the processing circuitry, at least one digital image captured by the at least one image sensor; partitioning at least one object, identified in the at least one digital image, into a plurality of object segments; replacing in the at least one digital image each of the plurality of object segments with a schematic segment, illustrating respective object segment, to produce at least one schematic image; and sending the at least one schematic image to the at least one remote hardware processor. According to the first aspect of the invention, the at least one remote hardware processor is adapted to: receiving the at least one schematic image from the at least one device; analyzing the at least one schematic image to identify at least one behavioral pattern of at least one schematic object identified in the at least one schematic image, each of the at least one schematic object comprising a plurality of schematic segments and illustrating one of the at least one object; and outputting an indication of the at least one behavioral pattern.

According to a second aspect of the invention, a method for processing digital images comprises: on at least one device: receiving from at least one image sensor, electrically coupled to a processing circuitry, at least one digital image captured by the at least one image sensor; partitioning at least one object, identified in the at least one digital image, into a plurality of object segments; replacing in the at least one digital image each of the plurality of object segments with a schematic segment, illustrating respective object segment, to produce at least one schematic image; and sending the at least one schematic image to the at least one remote hardware processor; and on at least one remote hardware processor: receiving the at least one schematic image from the at least one device; analyzing the at least one schematic image to identify at least one behavioral pattern of at least one schematic object identified in the at least one schematic image, each of the at least one schematic object comprising a plurality of schematic segments and illustrating one of the at least one object; and outputting an indication of the at least one behavioral pattern.

With reference to the first and second aspects, in a first possible implementation of the first and second aspects of the present invention the at least one object is a person or an animal. Optionally, at least one of the plurality of object segments is a body part. Optionally, the body part is selected from a group of body parts consisting of: a limb, a torso, a part of a torso, a head, a part of a limb, and a joint. Identifying a person or an animal allows concealing an identity of the person or animal by replacing a plurality of object segments of the person or animal, thus increasing usability of a device implemented according to the present invention, for example allowing usage in a space where there is an expectation of privacy. Identifying a body part facilitates identifying the at least one behavioral pattern according to a position or a movement of the body part, thus increasing accuracy of an identification of the at least one behavioral pattern. Optionally, the at least one object is a vehicle. Identifying a vehicle increases usability of a device implemented according to the present invention, for example allowing usage for traffic monitoring. Optionally, the schematic segment is a two-dimensional geometric object. Using a two dimensional geometric object allows obscuring one or more identifying features of the at least one object while still allowing identification of the at least one behavioral pattern, thus increasing accuracy of an output of a system implemented using the present invention compared to a system using other methods of obscuring an object segment such as pixelation.

With reference to the first and second aspects, in a second possible implementation of the first and second aspects of the present invention the at least one processing circuitry is further configured for removing from the at least one schematic image at least one other object, identified in the at least one digital image. Optionally, the at least one other object is selected from a group comprising: a person, a license plate, a building, a fence, an animal, and an identified private region. Removing the at least one other object facilitates removing private information from the at least one schematic image, thus increasing system security.

With reference to the first and second aspects, in a third possible implementation of the first and second aspects of the present invention the at least one behavioral pattern is identified according to at least one of: a posture of the at least one schematic object, at least one gesture of the at least one schematic object, and at least one cluster of the at least one schematic object. Optionally, the at least one behavioral pattern is selected from a group of possible behavioral patterns comprising: a congregation of persons, a person walking, a person running, a person falling, a person lying down, an object moving into a road, a person riding a bicycle, a person riding an electrical bicycle, contact between a vehicle and a person, a missed contact between a vehicle and a person, an altercation between at least two persons, an object bypassing an obstacle, a person being attacked, drawing of a weapon, stalking, vagrancy, and presence of a person in a restricted region. Identifying the at least one behavioral pattern according to one or more of a posture, a gesture, and a cluster of the at least one schematic object increases accuracy of identification of the at least one behavioral pattern.

With reference to the first and second aspects, in a fourth possible implementation of the first and second aspects of the present invention the at least one processing circuitry is configured for sending the at least one schematic image to the at least one remote hardware processor via at least one digital communication network interface connected to the at least one processing circuitry. Optionally, the at least one digital communication network interface is connected to a digital communication network selected from a group of networks comprising of: an Ethernet network, a wireless local area network, and a cellular network. Sending the at least one schematic image to the at least one remote hardware processor via at least one digital communication network interface facilitates processing the at least one schematic image in a remote location, reducing an amount of processing resources required on the at least one device and thus reducing cost of implementation and cost of operation of the at least one device.

With reference to the first and second aspects, in a fifth possible implementation of the first and second aspects of the present invention the at least one remote hardware processor is further adapted to computing a plurality of statistical values according to the at least one schematic object. Optionally, analyzing the at least one schematic image comprises computing the plurality of statistical values, and the indication of the at least one behavioral pattern comprises at least some of the plurality of statistical values. Optionally, the plurality of statistical values comprises at least one of: an amount of persons identified in an identified region of the at least one schematic image, an amount of persons identified in the at least one schematic image in an identified amount of time, an amount of persons identified in the at least one schematic image performing an identified activity, an amount of an identified event identified in the at least one schematic image, and an amount of vehicles identified in the at least one schematic image. Using a plurality of statistical values when analyzing the at least one schematic image increases accuracy of identification of the at least one behavioral pattern.

With reference to the first and second aspects, in a sixth possible implementation of the first and second aspects of the present invention outputting the indication of the at least one behavioral pattern comprises one or more of: storing the indication on at least one non-volatile digital storage connected to the at least one remote hardware processor, sending the indication to at least one other remote hardware processor, sending a message to a communication device of a user, displaying a message on a display device connected to the at least one remote hardware processor, and delivering an electrical signal to an audio device connected to the at least one remote hardware processor.

With reference to the first and second aspects, in a seventh possible implementation of the first and second aspects of the present invention partitioning the at least one object comprises executing at least one neural network by the at least one processing circuitry. Optionally, replacing in the at least one digital image each of the plurality of object segments comprises executing at least one other neural network by the at least one processing circuitry. Using at least one neural network to partition the at least one object, and additionally or alternatively using at least one other neural network to replace the plurality of object segments in the at least one digital image increases accuracy of a schematic image compared to some other image processing methods, for example region growing or k-means clustering.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a monitoring system and, more specifically, but not exclusively, to a monitoring system in a public space.

There is a need to process digital images in order to identify a behavioral pattern of interest. Some examples of a behavioral pattern are a congregation of persons, presence of a person in a restricted region, and an altercation between at least two people. However, there is also a need to preserve the privacy of people and other objects identifiable in the digital images. For example, when identifying a congregation of persons there may be a need to identify an amount of persons, while preserving anonymity of the persons themselves. In another example, when identifying an altercation between at least two people there may be a need to preserve anonymity of other people not party to the altercation.

Some existing solutions process digital images and digital videos on the camera that captured the digital images and the digital video. In such solutions there is still a risk that a captured image or a captured video can be accessed by an unauthorized entity gaining unauthorized access to the camera.

Some other existing solutions use a camera with an imaging sensor sensitive to non-visible light, such as infrared light and 3-dimensional lighting techniques. Such other solutions are more expensive that solutions using visible light. In addition, there are some video analytics applications that cannot be applied to images captured using non-visible light, for example processing that is dependent on color information, such as detection of a uniform or of a hard hat.

Yet some other existing solutions blur in a captured image one or more objects detected in the captured image, however blurring is not always sufficient to preserve a person's privacy, for example clothing colors may be preserved.

The present invention, in some embodiments thereof, proposes replacing one or more objects identified in a digital image with one or more schematic objects each illustrating one of the one or more objects, and analyzing the one or more schematic objects to identify one or more behavior patterns of the one or more schematic objects. In such embodiments, the one or more behavior patterns of the one or more schematic objects illustrate one or more real behavior patterns between the one or more objects identified in the one or more images, while preserving privacy of the one or more objects.

To do so, in some embodiments the present invention proposes identifying an object in a digital image and replacing the object with a plurality of schematic segments, each schematic segment illustrating one of a plurality of segments of the identified object. In such embodiments, one or more objects identified in one or more digital images are partitioned into a plurality of object segments, and each of the plurality of object segments is replaced with a schematic segment illustrating the respective object segment. For example, when an object is a person or an animal the plurality of object segments may comprise one or more body parts. Some examples of schematic segments are a line, a circle and a polygon. For example, a head may be replaced by a circle, a torso may be replaced by a rectangle and a limb may be replaced by a line. Optionally, the one or more objects are partitioned using one or more neural networks. One or more schematic images, comprising a plurality of schematic segments in place of the one or more objects, are optionally sent to one or more remote hardware processors, optionally for the purpose of performing an image related analysis. For example, the one or more schematic images may be analyzed to identify one or more behavioral patterns of the one or more schematic objects. Some examples of a behavioral pattern are a person walking, a congregation or persons, drawing of a weapon and presence of a person in a restricted region.

According to some embodiments of the present invention the one or more behavioral patterns illustrate one or more real behavioral patterns of the one or more objects identified in the one or more digital images. Thus, illustrating the one or more objects identified in the one or more digital images using one or more schematic objects, each comprising a plurality of schematic segments, allows identifying one or more real behavioral patterns of the one or more objects without exposing the one or more objects, increasing usability of a digital camera in spaces where there is an expectation of privacy. When one of the one or more objects is a person, the present invention facilitates identifying a real behavioral pattern of the person without violating the person's privacy by identifying a behavioral pattern of a schematic object illustrating the person. In addition, in such embodiments, should an unauthorized entity gain access to the one or more schematic images, as the one or more objects are replaced by the one or more schematic objects there is reduced risk of the unauthorized entity identifying the one or more objects and exposing private information of the one or more objects. Optionally, a device implemented according to the present invention comprises processing circuitry electrically coupled with an image sensor such that the one or more digital images are received by the processing circuitry from the image sensor without being stored in a memory component, for example a random access memory (RAM) component, and cannot be accessed by an entity external to the device, increasing security of a device implemented according to the present invention.

In addition the present invention, in some embodiments thereof, proposes computing a plurality of statistical values and indicating the at least one behavioral pattern using at least some of the plurality of statistical values. For example, a possible statistical value is an amount of persons identified in an identified region of the one or more schematic images. A possible behavioral pattern is a congregation of persons, and an indication of identifying the congregation of persons optionally comprises the amount of persons identified.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
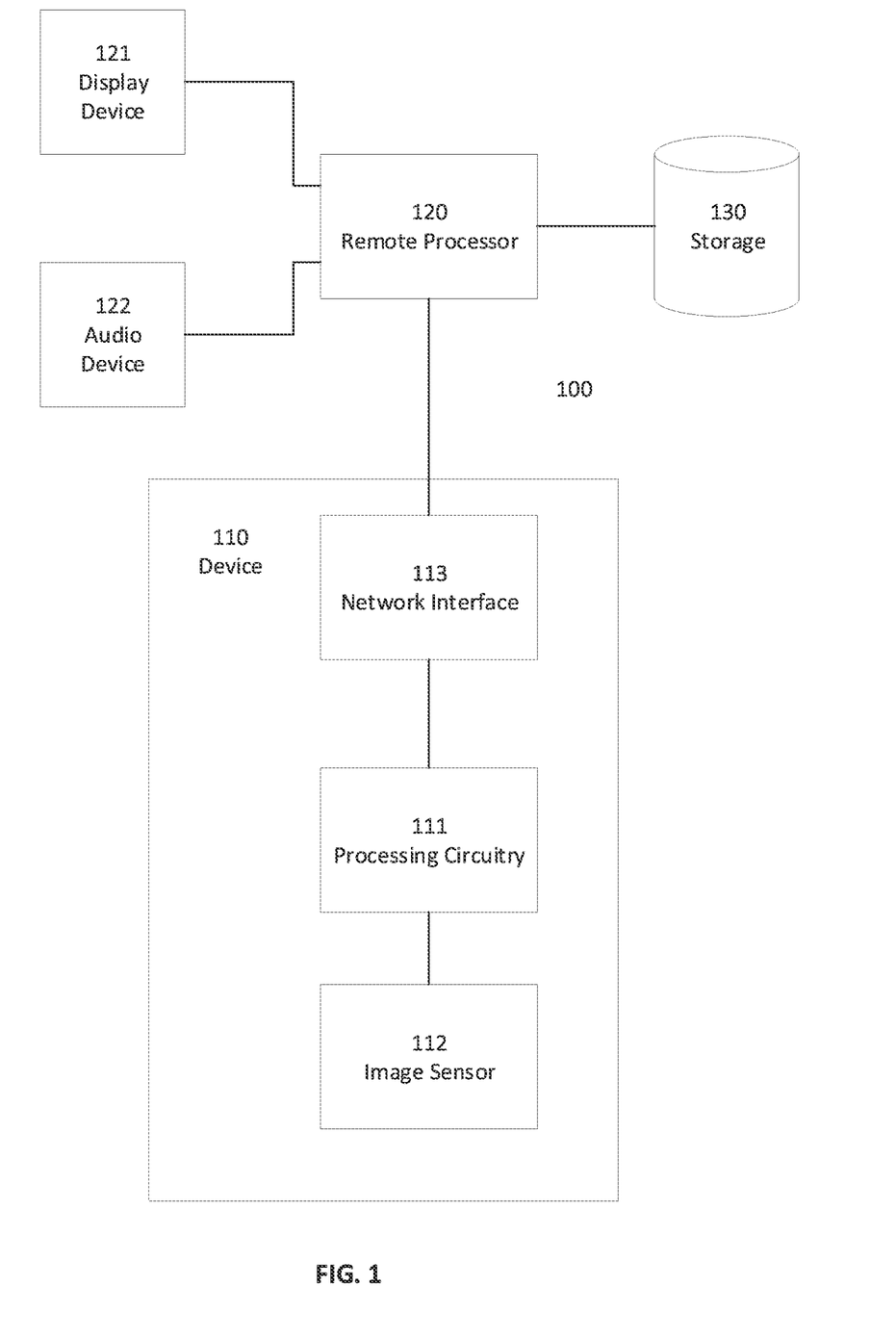
FIG. 1 is a schematic block diagram of an exemplary system, according to some embodiments of the present invention.

Reference is now made to FIG. 1, showing a schematic block diagram of an exemplary system 100, according to some embodiments of the present invention. In such embodiments, at least one device 100 comprises one or more processing circuitry 111, optionally electrically coupled with one or more image sensors 112. Some examples of an image sensor are a digital camera, a thermal imaging device, and a digital video camera. A processing circuitry may be any kind of programmable or non-programmable circuitry that is configured to carry out operations described below. A processing circuitry may comprise hardware as well as software. For example, a processing circuitry may comprise one or more hardware processors and transitory or non-transitory memory that carries a program which causes the processing circuitry to perform the respective operations when the program is executed by the one or more hardware processors. Optionally, at least one device 110 is connected to at least one remote hardware processor 120 for example for the purpose of processing, by at least one remote hardware processor 120, data sent from at least one device 101. Optionally, at least one remote hardware processor 120 comprises other programmable circuitry. Optionally, at least one device 110 comprises one or more digital communication network interfaces 113. For brevity, henceforth the term "network interface" is used to mean "one or more digital communication network interfaces, and the term processor is used to mean "one or more processing circuitry". Processor 111 may be connected to network interface 113 and optionally processor 111 is connected to at least one remote hardware processor 120 via network interface 113. Optionally, network interface 113 is connected to a digital communication network. Optionally, the digital communication network is a local area network, for example an Ethernet network, and a wireless local area network. Optionally, the digital communication network is a wide area network, for example a cellular network such as a Global System for Mobile (GSM) network.

Optionally, at least one remote hardware processor 120 is connected to one or more non-volatile digital storage 130, for example for the purpose of storing an output of at least one remote hardware processor 120. Some examples of a non-volatile digital storage are a hard disk drive, a network storage and a storage network. Optionally, at least one remote hardware processor 120 is connected to one or more display device 121, for example for the purpose of displaying a message. Some examples of a display device are a monitor and a computer screen. Optionally, at least one remote hardware processor 120 is connected to one or more audio device 122, for example for the purpose of generating an alarm. Some examples of an audio device are a speaker and a mobile device such as a mobile phone.

To process one or more digital images, system 100 implements, in some embodiments thereof, the following optional method.

Figure 2:
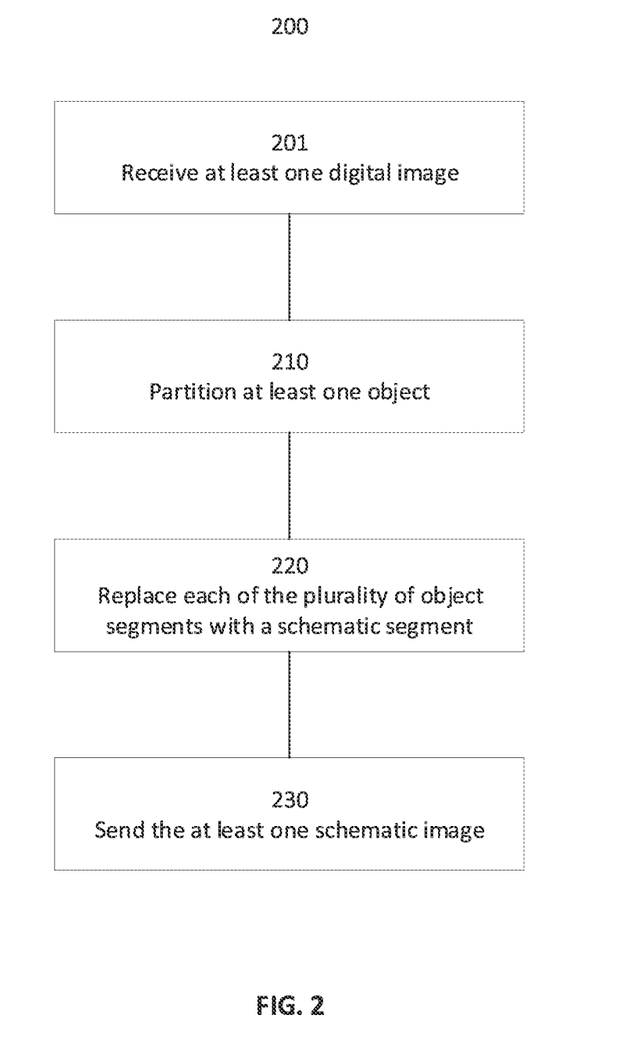
FIG. 2 is a flowchart schematically representing an optional flow of operations for a device, according to some embodiments of the present invention.

Reference is now made also to FIG. 2, showing a flowchart schematically representing an optional flow of operations 200 for a device, according to some embodiments of the present invention. In such embodiments, in 201 processor 111 receives from one or more image sensors 112 one or more digital images captured by one or more image sensors 112. In 210, processor 111 optionally partitions at least one object, identified in the one or more digital images, into a plurality of object segments. Optionally, the at least one object is a person. Optionally, the at least one object is an animal. Optionally, at least one of the plurality of object segments is a body part. For example, when the at least one object is a person, at least one of the plurality of object segments may be a body part of a person. Some examples of body parts are a limb such as an arm or a leg, a torso, a part of a torso such as a chest, an abdomen or a back, a head, a part of a limb such as a shin, a thigh, a hand, a foot or a forearm, and a joint such as a wrist, an elbow or a knee. Optionally, the at least one object is a vehicle. Some examples of vehicles are a car, a truck, a bicycle, and electrical bicycle, a skateboard, a hover-board and a Segway. Optionally, at least one of the plurality of object segments is a segment of a vehicle. Some examples of a segment of a vehicle are a license plate, a wheel, a saddle, a handlebar, a frame, a cab, a platform, a container and a window. Optionally, processor 111 executes at least one neural network to partition the at least one object.

In 220, processor 111 optionally replaces in the one or more digital images each of the plurality object segments with a schematic segment illustrating the respective object segments, to produce one or more schematic images. Optionally, a schematic segment is a two-dimensional geometric object. Some examples of two-dimensional geometric objects are a line, a circle, a polygon, and an annulus. Some examples of a polygon are a triangle, a square, a rectangle and an octagon. An annulus may have a circular cross section. An annulus may have a polygon cross section. For example, when the at least one object is a person, the person may be partitioned into a plurality of object segments comprising a head, a torso, a left arm, a left shoulder, a right arm, and a right shoulder. In such an example, processor 111 may replace the head with a circle, the torso with a rectangle, the left arm and the right arm each with a line and the left shoulder and the right shoulder each with another circle, optionally smaller than the circle used to replace the head. Optionally, each of the schematic segments has a color. Optionally, processor 111 executes at least one other neural network to replace in the one or more digital images each of the plurality object segments.

In 230, processor 111 optionally sends the one or more schematic images to at least one hardware processor 120.

In some embodiments, processor 111 additionally removes one or more objects from the one or more schematic images.

Figure 3:
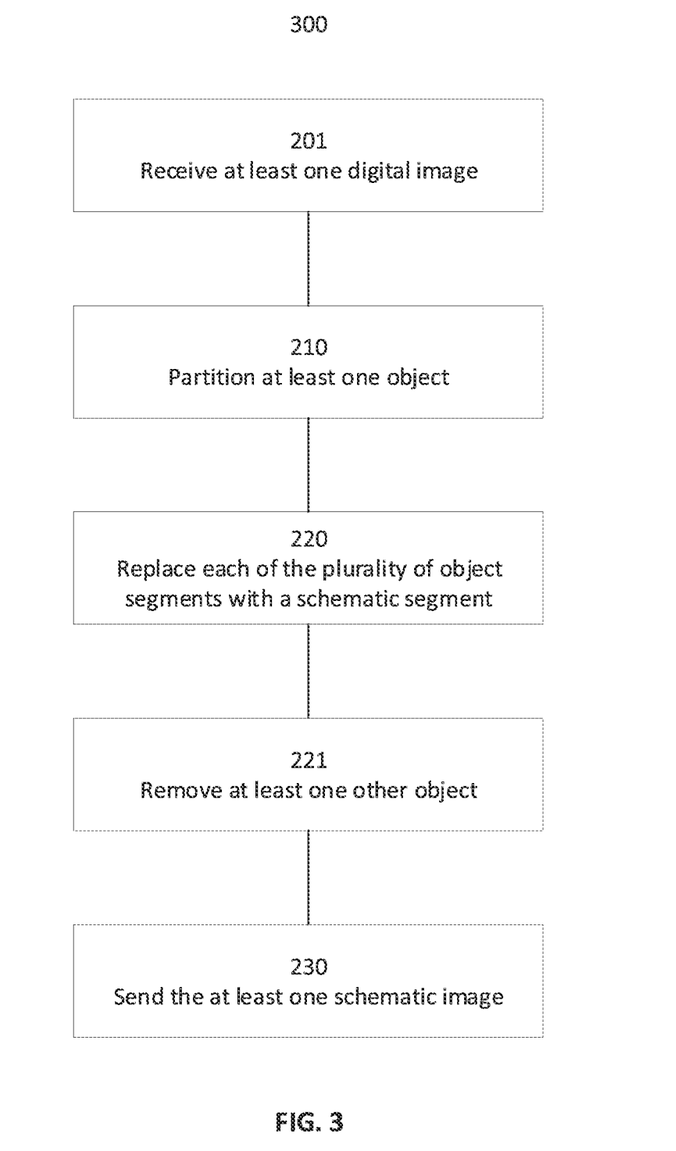
FIG. 3 is a flowchart schematically representing another optional flow of operations for a device, according to some embodiments of the present invention.

Reference is now made also to FIG. 3, showing a flowchart schematically representing another optional flow of operations 300 for a device, according to some embodiments of the present invention. In such embodiments, before sending the one or more schematic images to at least one hardware processor 120 in 230, processor 111 removes in 221 from the one or more schematic images at least one other object identified in the one or more digital images. Optionally, the at least one other object is a fixed object, for example a building or a fence. Optionally, processor 111 removes at least one object segment of the plurality of object segments instead of replacing the at least one object segment with one or more schematic object segments. For example, the at least one other object may be a vehicle part, for example a license plate. Optionally, processor 111 removes the license plate instead of replacing the license plate with a schematic segment. Optionally, the at least one object is an identified private region, i.e. an area in at least one of the one or more digital images identified as private.

To identify one or more behavior patterns in the one or more schematic images, in some embodiments of the present invention system 100 further implements the following optional method.

Figure 4:
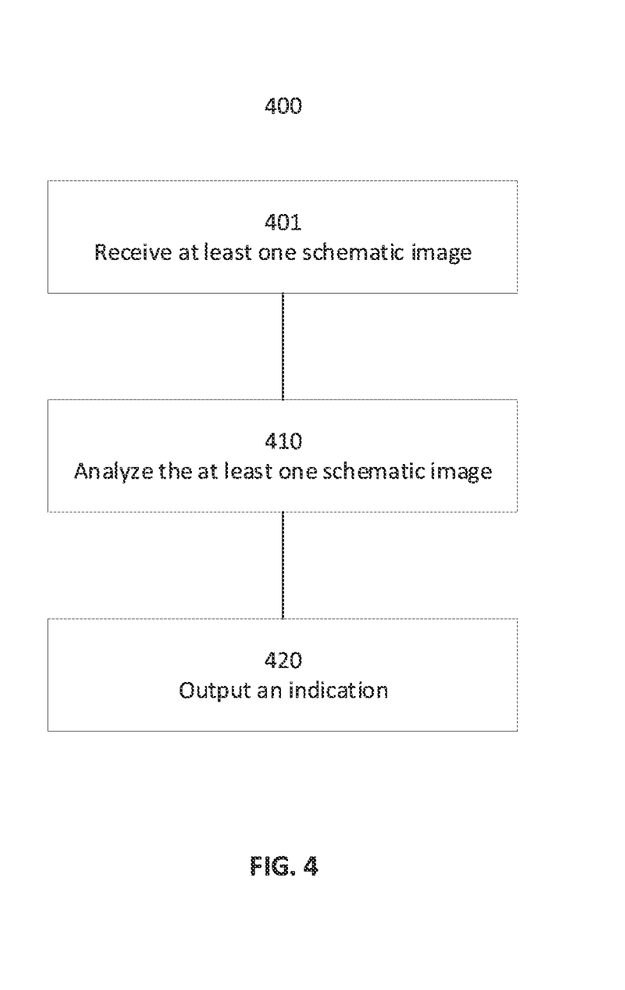
FIG. 4 is a flowchart schematically representing an optional flow of operations for processing a schematic image, according to some embodiments of the present invention.

Reference is now made also to FIG. 4, showing a flowchart schematically representing an optional flow of operations 400 for processing a schematic image, according to some embodiments of the present invention. In such embodiments, in 401 at least one remote hardware processor 101 receives the one or more schematic images from at least one device 110. In 410, at least one remote hardware processor 120 optionally analyzed the one or more schematic images.

Figure 5:
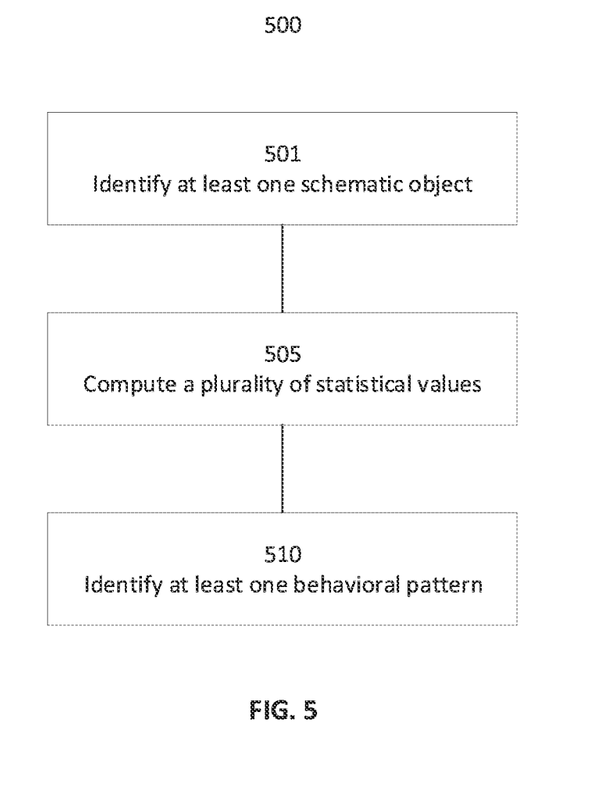
FIG. 5 is a flowchart schematically representing an optional flow of operations for analyzing a schematic image, according to some embodiments of the present invention.

Reference is now made also to FIG. 5, showing a flowchart schematically representing an optional flow of operations 500 for analyzing a schematic image, according to some embodiments of the present invention. Optionally, in 501 at least one hardware processor 120 identifies in the one or more schematic images one or more schematic objects. Optionally, each of the one or more schematic objects comprises a plurality of schematic segments and illustrates one of the at least one object identified by processor 111 in the one or more digital images. In 510, at least one remote hardware processor 120 optionally identifies at least one behavioral pattern of the one or more schematic objects. Some examples of a behavioral pattern are: a congregation of persons, a person walking, a person running, a person falling, a person lying down, an object moving into a road, a person riding a bicycle, a person riding an electrical bicycle, contact between a vehicle and a person, a missed contact between a vehicle and a person, an altercation between at least two persons, an object bypassing an obstacle, a person being attacked, drawing of a weapon, stalking, vagrancy, and presence of a person in a restricted region. Optionally, at least one hardware processor 120 identifies the at least one behavioral pattern according to a posture of at least one of the one or more schematic objects. Some examples of a schematic object's posture are an object is lying down, and an object is hunched. Optionally, at least one hardware processor 120 identifies the at least one behavioral pattern according to a gesture performed by the at least one schematic object. Some examples of a gesture are raising hands above head, moving hands in front of face, and bending. Optionally, at least one hardware processor 120 identifies the at least one behavioral pattern according to one or more clusters of schematic objects of the one or more schematic objects. Some examples of a cluster of objects are traffic congestion, backload of passengers due to tardy public transportation, and a gang assembling to attack another person or other cluster of persons. Optionally, at least one remote hardware processor 120 identifies the at least one behavioral pattern executing at least one additional neural network.

Optionally, at least one remote hardware processor 120 computes in 505 a plurality of statistical values according to the one or more schematic objects. Some examples of a statistical value are: an amount of persons identified in an identified region of the one or more schematic images, an amount of persons identified in the one or more schematic images in an identified amount of time, an amount of persons identified in the one or more schematic images performing an identified activity, an amount of an identified event identified in the one or more schematic images, and an amount of vehicles identified in the one or more schematic images. Some examples of an identified event are an almost collision between two or more vehicles, and physical contact between two or more persons.

The plurality of statistical values is optionally used to identify a condition existing in a space monitored by at least one device 101. Some examples of a condition are gathering of a crowd, a problem with public transportation, a traffic load, and improper use of public space. Optionally, the one or more behavioral patterns identified in 510 comprise at least some of the plurality of statistical values.

Reference is now made again to FIG. 4. In 420, at least one remote hardware processor 120 optionally outputs an indication of the one or more behavioral patterns identified in 410. Optionally, at least one remote hardware processor 120 stores the indication on one or more non-volatile digital storage 130. Optionally, at least one remote hardware processor 120 sends the indication to at least one other remote hardware processor, for example using an electronic mail digital communication protocol. Optionally, at least one remote hardware processor 120 sends the indication to a communication device of a user, for example a mobile phone or a two-way radio transceiver. Optionally, at least one remote hardware processor 120 displays a message on one or more display device 121. Optionally, at least one remote hardware processor 120 delivers an electrical signal to one or more audio device 122, for example for the purpose of sounding an alarm.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image sensors will be developed and the scope of the term image sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for processing digital images comprising:
at least one remote hardware processor; and
at least one device, comprising at least one processing circuitry configured for:
receiving from at least one image sensor electrically couple to the processing circuitry, at least one digit image capture by the at least one image sensor;
partitioning at least one object, identified in the at least one digital image, into a plurality of object segments;
replacing in the at least one digital image each of the plurality of object segments with a schematic segment, illustrating respective object segment, to produce at least one schematic image; and
sending the at least one schematic image to the at least one remote hardware processor;
wherein the at least one remote hardware processor is adapted to:
receiving the at least one schematic image from the at least one device;
performing image related analysis of the at least one schematic image to extract data related to the schematic image; and
outputting information based on the extracted data;
wherein performing image related analysis of the at least one schematic image to extract data related to the schematic image comprises:
identifying at least one schematic object in the at least one schematic image, each of the at least one schematic object comprising a plurality of schematic segments and illustrating one of the at east one object; and
computing a plurality of statistical values according to the at least one schematic object.

2. The system of claim 1, wherein the at least one object is a person or an animal.

3. The system of claim 2, wherein at least one of the plurality of object segments is a body part.

4. The system of claim 3, wherein the body part is selected from a group of body parts consisting of: a limb, a torso, a part of a torso, a head, a part of a limb, and a joint.

5. The system of claim 1, wherein the at least one object is a vehicle.

6. The system of claim 1, wherein the schematic segment is a two-dimensional geometric object.

7. The system of claim 1, wherein the at least one processing circuitry is further configured for removing from the at least one schematic image at least one other object, identified in the at least one digital image.

8. The system of claim 7, wherein the at least one other object is selected from a group comprising: a person, a license plate, a building, a fence, an animal, and an identified private region.

9. The system of claim 1, wherein the at least one processing circuitry is configured for sending the at least one schematic image to the at least one remote hardware processor via at least one digital communication network interface connected to the at least one processing circuitry.

10. The system of claim 9, wherein the at least one digital communication network interface is connected to a digital communication network selected from a group of networks comprising of: an Ethernet network, a wireless local area network, and a cellular network.

11. The system of claim 1, wherein replacing in the at least one digital image each of the plurality of object segments comprises executing at least one neural network by the at least one processing circuitry.

12. The system of claim 1, wherein performing image related analysis of the at least one schematic image to extract data related to the schematic image further comprises:
analyzing the at least one schematic image to identify at least one behavioral pattern of the at least one schematic object; and
outputting an indication of the at least one behavioral pattern.

13. The system of claim 12, wherein the at least one behavioral pattern is identified according to at least one of: a posture of the at least one schematic object, at least one gesture of the at least one schematic object, and at least one cluster of the at least one schematic object.

14. The system of claim 12, wherein the at least one behavioral pattern is selected from a group of possible behavioral patterns comprising: a congregation of persons, a person walking, a person running, a person falling, a person lying down, an object moving into a road, a person riding a bicycle, a person riding an electrical bicycle, contact between a vehicle and a person, a missed contact between a vehicle and a person, an altercation between at least two persons, an object bypassing an obstacle, a person being attacked, drawing of a weapon, stalking, vagrancy, and presence of a person in a restricted region.

15. The system of claim 12, wherein outputting the indication of the at least one behavioral pattern comprises one or more of: storing the indication on at least one non-volatile digital storage connected to the at least one remote hardware processor, sending the indication to at least one other remote hardware processor, sending a message to a communication device of a user, displaying a message on a display device connected to the at least one remote hardware processor, and delivering an electrical signal to an audio device connected to the at least one remote hardware processor.

16. The system of claim 12, wherein analyzing the at least one schematic image comprises computing another plurality of statistical values; and
wherein the indication of the at least one behavioral pattern comprises at least some of the other plurality of statistical values.

17. The system of claim 16, wherein the other plurality of statistical values comprises at least one of: an amount of persons identified in an identified region of the at least one schematic image, an amount of persons identified in the at least one schematic image in an identified amount of time, an amount of persons identified in the at least one schematic image performing an identified activity, an amount of an identified event identified in the at least one schematic image, and an amount of vehicles identified in the at least one schematic image.

18. The system of claim 12, wherein partitioning the at least one object comprises executing at least one other neural network by the at least one processing circuitry.

19. The system of claim 1, further comprising identifying, based at least in part on a plurality of statistical values, at least one condition existing in space monitored by at least one image sensor, wherein the at least one condition existing in space is identified according to at least one of: gathering of a crowd, a problem with public transportation, a traffic load, and improper use of public space.

* * * * *